US010162086B2

(12) United States Patent
Huang et al.

(10) Patent No.: US 10,162,086 B2
(45) Date of Patent: Dec. 25, 2018

(54) IMAGING THROUGH HIGHLY DIFFUSIVE MEDIA WITH WAVEFRONT SHAPING

(71) Applicant: Microsoft Technology Licensing, LLC, Redmond, WA (US)

(72) Inventors: Jiandong Huang, Bellevue, WA (US); Rostislav Boltyanskiy, Brooklyn, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 221 days.

(21) Appl. No.: 15/188,833

(22) Filed: Jun. 21, 2016

(65) Prior Publication Data

US 2017/0254932 A1    Sep. 7, 2017

Related U.S. Application Data

(60) Provisional application No. 62/304,860, filed on Mar. 7, 2016.

(51) Int. Cl.
*G01B 11/02* (2006.01)
*G02B 26/06* (2006.01)
(Continued)

(52) U.S. Cl.
CPC ........... *G02B 5/0294* (2013.01); *G02B 26/06* (2013.01); *G02B 27/0938* (2013.01); *G02F 1/21* (2013.01);
(Continued)

(58) Field of Classification Search
CPC ....... G02B 26/06; G02B 27/0938; G02F 1/21; H04N 9/3161
See application file for complete search history.

(56) References Cited

U.S. PATENT DOCUMENTS 5,291,314 A * 3/1994 Agranat .................... G02F 1/21
359/11
6,332,093 B1   12/2001 Painchaud et al.
(Continued)

FOREIGN PATENT DOCUMENTS

WO    2008001137 A2    1/2008
WO    2010125367 A1    11/2010
WO    2015184549 A1    12/2015

OTHER PUBLICATIONS

"International Search Report and Written Opinion Issued in PCT Application No. PCT/US2017/019804", dated May 23, 2017, 12 Pages.
(Continued)

*Primary Examiner* — Michael A Lyons
(74) *Attorney, Agent, or Firm* — Holzer Patel Drennan

(57) ABSTRACT

An image decoding system provides a phase pattern encoding a target image. A spatial light modulator is configured to emit a wavefront-shaped light signal based on the phase pattern. A first diffusive medium receives the wavefront-shaped light signal and emits a decoded scattered light signal of the target image. The target image is previously encoded in the phase pattern by transmitting another wavefront-shaped light signal shaped by a training phase pattern through a second diffusive medium to yield a scattered light signal encoding a test image. The second diffusive medium has the optical scattering characteristics of a first diffusive medium. The scattered light signal encoding the test image is emitted from the second diffusive medium and recorded. The training phase pattern is adjusted for successive iterations of the test image until the test image satisfies a compensation condition. The resulting training phase pattern yields the phase pattern.

20 Claims, 9 Drawing Sheets

(51) Int. Cl.
  *G02B 5/02* (2006.01)
  *G06T 7/00* (2017.01)
  *G06T 9/00* (2006.01)
  *H04N 19/44* (2014.01)
  *H04N 19/63* (2014.01)
  *G02F 1/21* (2006.01)
  *G02B 27/09* (2006.01)
  *G03H 1/00* (2006.01)
  *H04N 9/31* (2006.01)

(52) U.S. Cl.
  CPC ............ *G03H 1/00* (2013.01); *G06T 7/0012* (2013.01); *G06T 9/00* (2013.01); *H04N 9/3161* (2013.01); *H04N 19/45* (2014.11); *H04N 19/63* (2014.11)

(56) References Cited

U.S. PATENT DOCUMENTS

| | | | |
|---|---|---|---|
| 7,241,988 B2 | 7/2007 | Gruber et al. | |
| 7,339,170 B2 * | 3/2008 | Deliwala | G01J 3/02 250/351 |
| 7,473,890 B2 | 1/2009 | Grier et al. | |
| 9,179,841 B2 | 11/2015 | Kim | |
| 2003/0190115 A1 * | 10/2003 | Culver | G02B 6/29358 385/18 |
| 2005/0007550 A1 | 1/2005 | Turkov et al. | |
| 2007/0171366 A1 | 7/2007 | Su et al. | |
| 2008/0218817 A1 * | 9/2008 | Grygier | G03H 1/028 359/9 |
| 2008/0247017 A1 * | 10/2008 | Wu | G03H 1/0011 359/21 |
| 2009/0002787 A1 * | 1/2009 | Cable | G03H 1/2294 359/9 |
| 2013/0194644 A1 | 8/2013 | Cable et al. | |
| 2014/0104618 A1 | 4/2014 | Potsaid et al. | |
| 2015/0002844 A1 * | 1/2015 | Park | G01N 21/49 356/338 |
| 2015/0043048 A1 | 2/2015 | Zheludev et al. | |
| 2015/0109427 A1 | 4/2015 | Wood et al. | |
| 2016/0037146 A1 | 2/2016 | McGrew | |
| 2016/0338592 A1 * | 11/2016 | Masumura | G01N 21/4795 |

OTHER PUBLICATIONS

Nixon, et al., "Real-time wavefront-shaping through scattering media by all optical feedback", In Journal of Nature Photonics, vol. 7, Issue 11, Oct. 6, 2013, pp. 1-16.

Yu, et al., "Recent advances in wavefront shaping techniques for biomedical applications", In Journal of Current Applied Physics, vol. 15, No. 5, May 31, 2015, 14 pages.

Vellekoop, Ivo M., "Feedback-based wavefront shaping", In Journal of Optics Express vol. 23, Issue 9, Apr. 30, 2015, pp. 12189-12206.

Yoon, et al., "Measuring optical transmission matrices by wavefront shaping", In Journal of Optics Express vol. 23, Issue 8, Apr. 20, 2015, 10 pages.

Aulbach, et al., "Control of Light Transmission through Opaque Scattering Media in Space and Time", In Journal of Physical Review Letters, vol. 106, Issue 10, Mar. 8, 2011, pp. 1-10.

Sui, et al. "Imaging in diffuse media with pulsed-ultrasound-modulated light and the photorefractive effect", In Journal of Applied Optics, vol. 44, Issue 19, Jul. 1, 20015, pp. 4041-4048.

* cited by examiner

IMAGING THROUGH HIGHLY DIFFUSIVE MEDIA WITH WAVEFRONT SHAPING

CROSS-REFERENCE TO RELATED APPLICATIONS

The present application claims benefit of priority to U.S. Provisional Patent Application No. 62/304,860, entitled "Imaging Through Highly Diffusive Media with Wavefront Shaping" and filed on Mar. 7, 2016, which is specifically incorporated by reference for all that it discloses and teaches.

BACKGROUND

Transmitting high frame rate encoded images (e.g., a video) is challenging. Typically, the latencies involved in encoding image frames for transmission and decoding the image frames upon reception, particularly the latter, are substantial enough to be impractical for high frame rate use.

SUMMARY

The described technology provides an image decoding system including a phase pattern having a target image encoded therein. A spatial light modulator is communicatively coupled to receive the phase pattern and configured to emit a wavefront-shaped light signal based on the phase pattern. A first diffusive medium positioned to receive the wavefront-shaped light signal and to emit a decoded scattered light signal of the target image. The target image is previously encoded in the phase pattern by transmitting a wavefront-shaped light signal shaped by a training phase pattern through a second diffusive medium to yield a scattered light signal encoding a test image. The second diffusive medium has the optical scattering characteristics of a first diffusive medium. The scattered light signal encoding the test image is emitted from the second diffusive medium and recorded. The training phase pattern is adjusted for successive iterations of the test image until the test image satisfies a compensation condition based on the target image. The resulting training phase pattern yields the phase pattern having a target image encoded therein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

An example image encoding system using a diffusive medium can encode an image in a phase pattern. Thereafter, the phase pattern can be used to a generate wavefront-shaped light signal containing a coding of the image. In an example image decoding system, the wavefront-shaped light signal can then be transmitted through a copy of the diffusive medium (or the original diffusive medium) to decode the image from the wavefront-shaped light signal. Other implementations may be employed.

Figure 1:
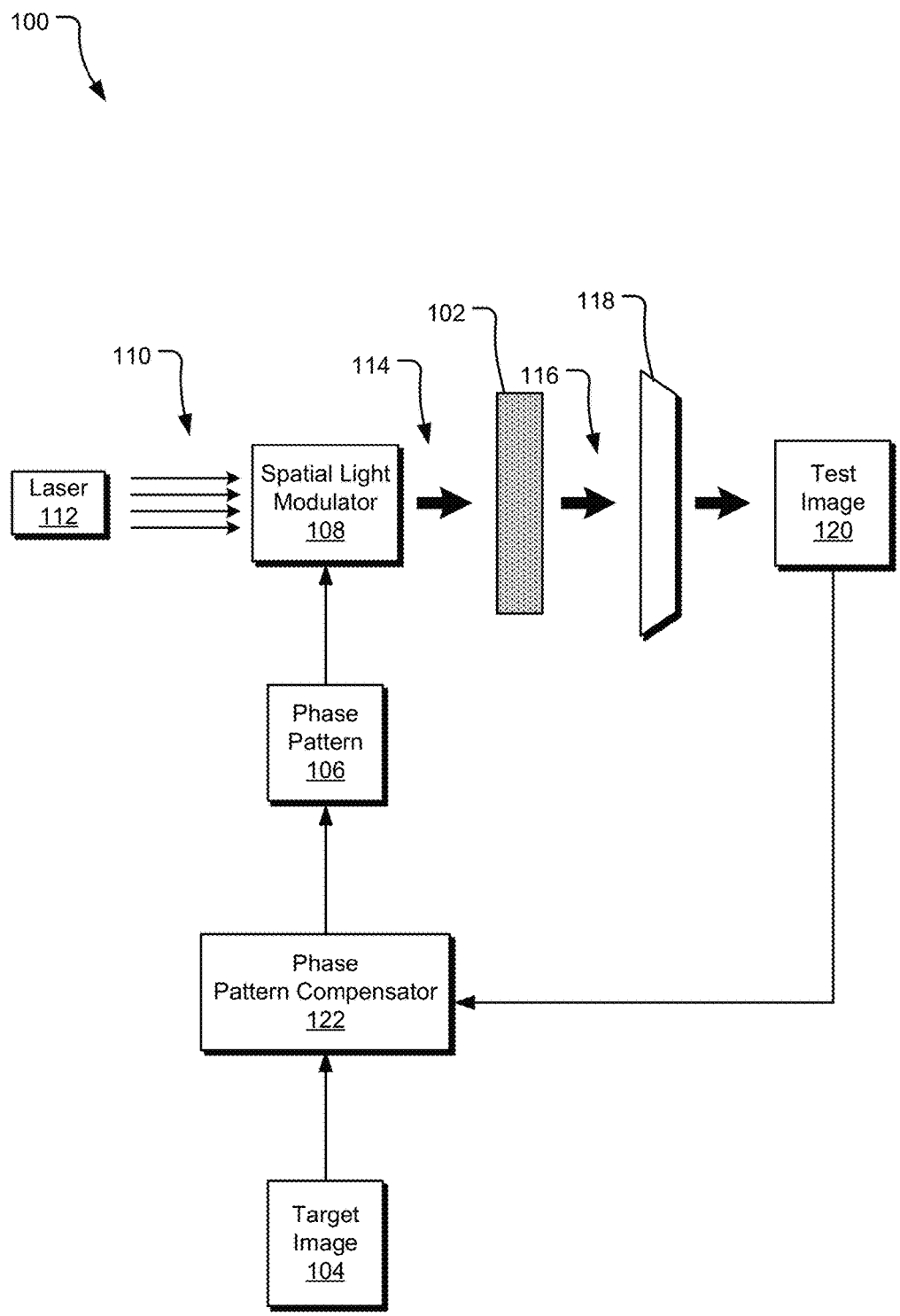
FIG. 1 illustrates an example image encoding system using a diffusive medium to encode a target image in a phase pattern.

FIG. 1 illustrates an example image encoding system 100 using a diffusive medium 102 to encode a target image 104 in a phase pattern 106. The diffusive medium 102 exhibits the characteristic of optically scattering light transmitted through it. As used herein, the terms "diffuse medium" or "diffusive medium" are used interchangeably and refer to a light-transporting medium in which light signals passing through the medium suffer multiple scattering events with small particles or regions within a generally homogenous medium, thereby randomizing the phase across the wavefront of a light signal emitted from the diffusive medium. Diffusive media can be duplicated, such that multiple copies of a particular diffusive medium can be manufactured to exhibit the same optical scattering properties. As such, reference herein to a diffusive medium indicates an original diffusive medium that is used to encode a target image into a phase pattern or a copy of that diffusive medium.

In one implementation, the phase pattern 106 is data recorded on a pixel-by-pixel basis for input to a spatial light modulator 108 to shape the wavefront of collimated light 110, such as that generated by a laser 112, thereby generating a wavefront-shaped light signal 114. The spatial light modulator 108 adjusts (e.g., modulates) the phase of light corresponding to pixels or areas of the phase pattern 106 (wherein a pixel is considered a small area of the phase patter 106) to generate the wavefront-shaped light signal 114 having different phases at different pixels or areas across the wavefront region (wherein a pixel is considered a small area of the wavefront region). In alternative implementations, the light input to the spatial light modulator 108 need not be collimated, as coherent light may be employed instead.

In a first iteration, the phase pattern 106 can initially be an arbitrary pattern or a predetermined initial pattern, which is updated by a phase pattern compensator 122 to converge on a phase pattern 106 that yields (e.g., best yields or approximates) the target image 104. In each iteration, the wavefront-shaped light signal 114 is transmitted through the diffusive medium 102, and a decoded scattered light signal 116 is output to and recorded by an image capture apparatus 118 (e.g., a camera) as a test image 120. The test image 120 is then fed back to the phase pattern compensator 122, which adjusts the phase pattern 106 to yield a test image 120 that more closely matches the target image 104. In this manner, upon satisfaction of a compensation condition, the target image 104 is encoded in the resulting phase pattern 106.

The compensation condition represents a level of accurate correspondence between the test image 120 and the target image 104 that satisfies system requirements. For example, the compensation condition may define a threshold number of pixels matching between the test image 120 and the target image 104. Alternatively, the compensation condition may define a statistical measure of satisfactory matching between the test image 120 and the target image 104 over a corresponding pixels or areas of the images (wherein a pixel is considered a small area of the image) or over the entire area of the images.

In one implementation, the phase pattern compensator 122 employs a pattern matching technique or a pattern optimization technique to update the phase pattern 106 in successive iterations. In this manner, the phase pattern compensator 122 generates a resulting phase pattern 106 that yields the test image 120 that accurately (e.g., as determined by a compensation condition) matches the target image 104. Pattern matching or pattern optimization may employ probabilistic and non-probabilistic methods, including without limitation elements of one or more of simulated annealing, perturbation stochastic approximation, Bayesian statistics, classification algorithms, neural networks, perceptrons, support vector machines, clustering, ensemble learning, regression, etc. After achieving the phase pattern 106 that satisfies the compensation condition, the phase pattern 106 may be used in combination with the diffusive medium 102 to decode the target image 104 from the phase pattern 106.

Figure 2:
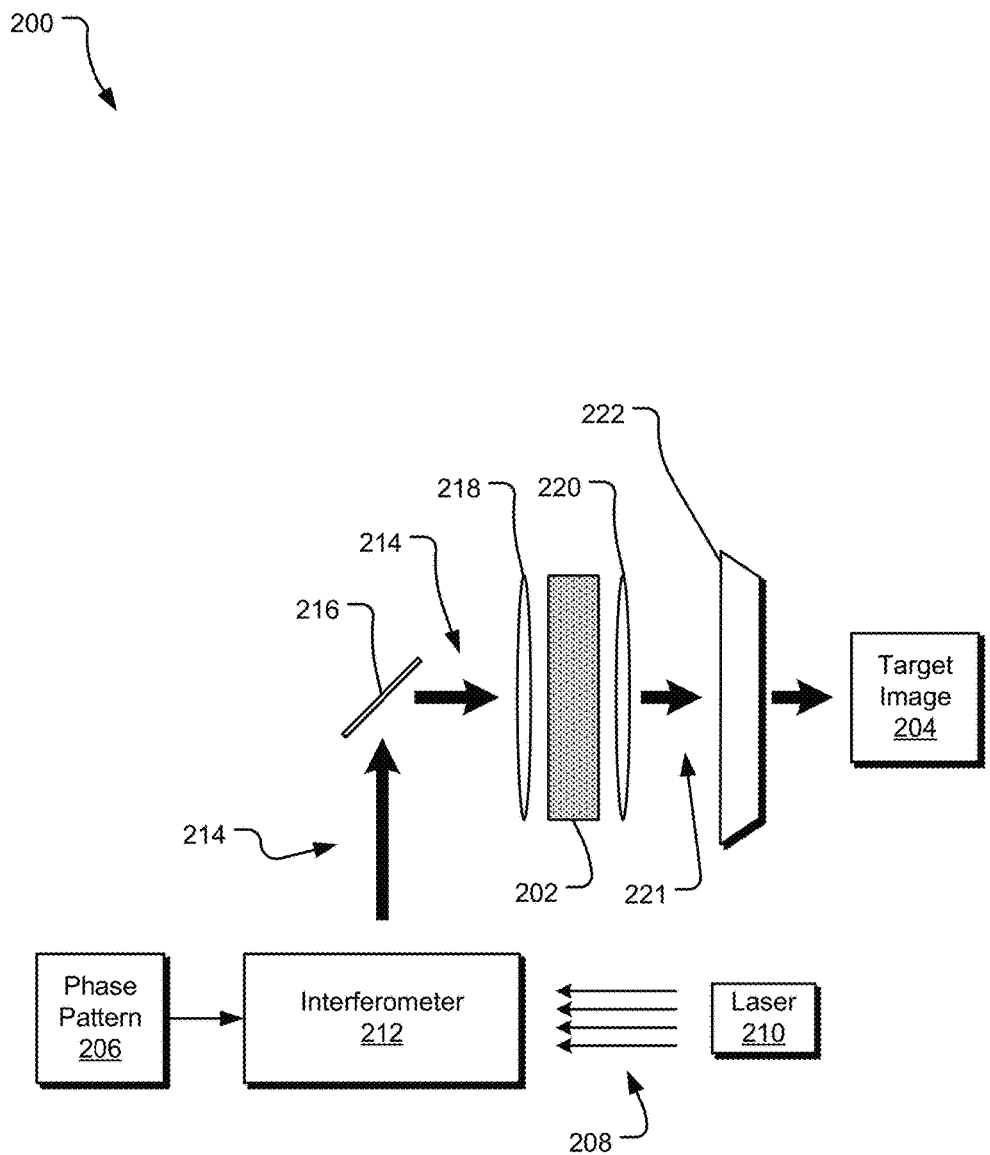
FIG. 2 illustrates an example image decoding system using a diffusive medium to decode a target image from a phase pattern.

FIG. 2 illustrates an example image decoding system 200 using a diffusive medium 202 to decode a target image 204 from a phase pattern 206. In one implementation, the phase pattern 206 is generated using the same process or a similar process as described with regard to the encoding system of FIG. 1. Regardless of the encoding process used, however, the phase pattern 206 is encoded with the target image 204.

To decode the phase pattern 206 and obtain the target image 204, collimated light 208, such as that generated by a laser 210, is transmitted into an interferometer 212, which also receives the phase pattern 206 as input. The interferometer 212 adjusts (e.g., modulates) the phase of light corresponding to pixels or areas of the phase pattern 206 (wherein a pixel is considered a small area of the phase pattern) to generate a wavefront-shaped light signal 214 having different phases at different pixels or areas across the wavefront region (wherein a pixel is considered a small area of the wavefront region). The wavefront-shaped light signal 214 represents an encoded version of the target image 204 based on the phase differences in the light signal that can be decoded by the diffusive medium 202. In alternative implementations, the light input to the interferometer 212 need not be collimated, as coherent light may be employed instead.

A mirror 216 directs the wavefront-shaped light signal 214 through an objective 218 (e.g., one or more lenses), the diffusive medium 202, and another objective 220. An image capture apparatus 222 (e.g., a camera) records the scattered light signal 221 emitting from the objective 220 as the decoded target image 204.

In one example, copies of the diffusive medium 202 can be distributed to an image or video receiving system for decoding of the encoded images or video frames by multiple decoding systems. In one implementation, multiple phase patterns may be applied in rapid sequence to the interferometer 212 to generate a sequence of wavefront-shaped "frames" that can be decoded in real-time as the frames are transmitted through the diffusive medium 202. In this manner, the image decoding system 200 can process high frame rate encoded images.

In at least one implementation, the wavefront-shaped light signal is translationally and/or rotationally in the same alignment with the diffusive medium in the encoding and decoding processes. Such alignment can be based on the translational and/or rotational positioning of the spatial light modulator and phase pattern pair and the positioning of optical elements in the path between the spatial light modulator and the diffusive medium. Translational alignment is described with reference to an X-Y plane of the diffusive medium, wherein the Z axis of the diffusive medium is substantially aligned with the optical path of the wavefront-shaped light signal through the diffusive medium. In contrast, rotational alignment is described with reference to a rotational alignment about the Z axis of the diffusive medium.

In an example of a light source providing coherent light, accurate encoding and decoding can be dependent upon common translational and rotational alignment in the encoding and the decoding processes and systems. In an example of a light source providing collimated light, accurate encoding and decoding can be dependent upon common translational alignment in the encoding and the decoding processes and systems, and not necessarily on common rotational alignment. Other implementations may provide encoding and decoding without any dependence upon alignment.

Figure 3:
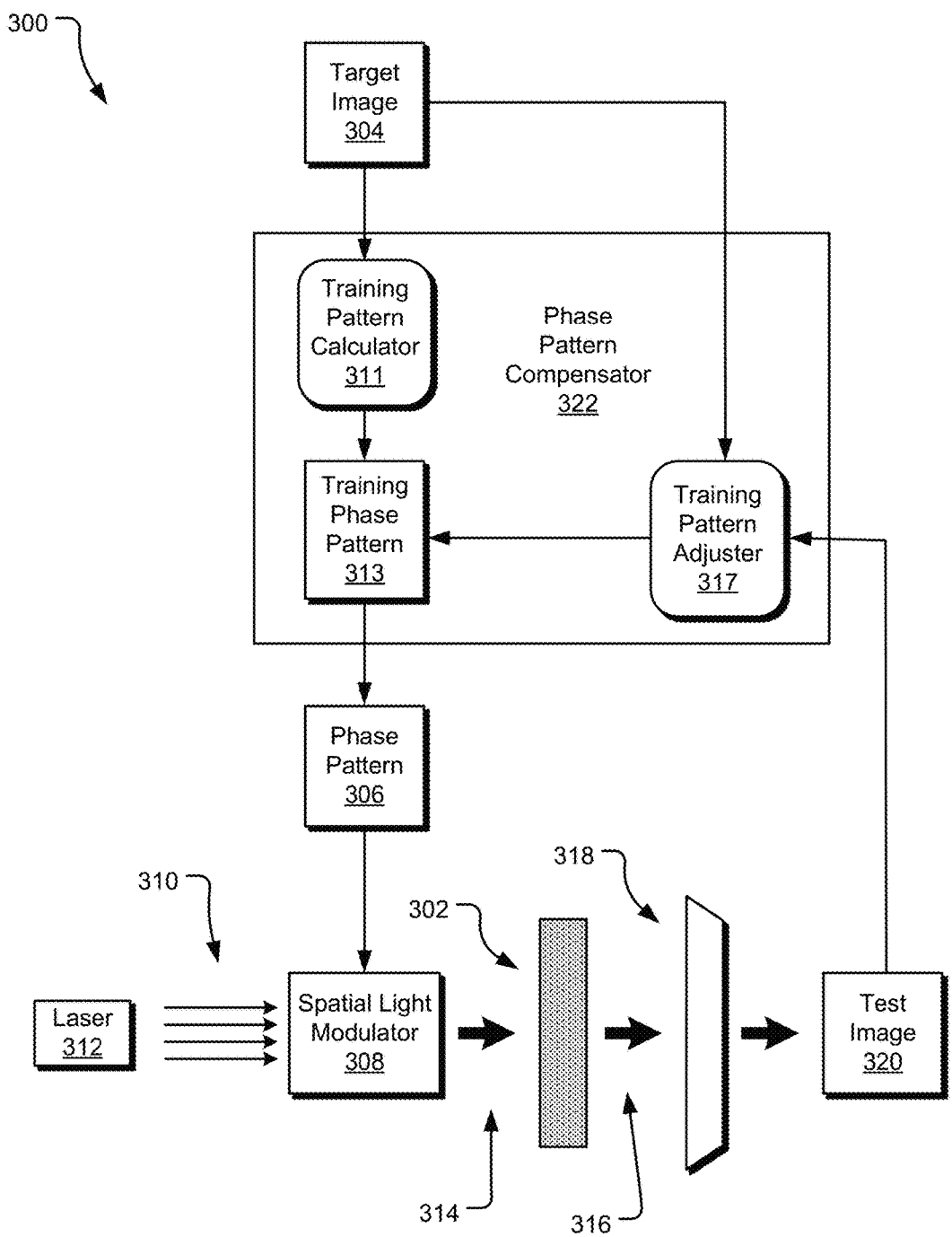
FIG. 3 illustrates details of an example image encoding system using a diffusive medium to encode a target image in a phase pattern.

FIG. 3 illustrates details of an example image encoding system 300 using a diffusive medium 302 to encode a target image 304 in a phase pattern 306. In one implementation, the phase pattern 306 is data recorded on a pixel-by-pixel basis for input to a spatial light modulator 308 to shape the wavefront of collimated light 310, such as that generated by a laser 312, thereby generating a wavefront-shaped light signal 314. The spatial light modulator 308 adjusts (e.g., modulates) the phase of light corresponding to pixels or areas of the phase pattern 306 (wherein a pixel is considered a small area of the phase pattern) to generate the wavefront-shaped light signal 314 having different phases at different pixels or areas across the wavefront region (wherein a pixel is considered a small area of the wavefront region). In alternative implementations, the light input to the spatial light modulator 308 need not be collimated, as coherent light may be employed instead.

In a first iteration, the phase pattern 306 can be an arbitrary pattern or a predetermined initial pattern, which is updated by a phase pattern compensator 322 to converge on a phase pattern 306 that yields (e.g., best yields or approximates) the target image 304. In one implementation, the target image 304 is input to a training pattern calculator 311 to develop a predetermined initial phase pattern as an initial training phase pattern 313. In an alternative implementation, the initial training phase pattern 313 is an arbitrary pattern, such that the phase pattern compensator 322 omits the training pattern calculator 311. The initial training phase pattern 313 is output from the phase pattern compensator 322 as the phase pattern 306 in the first iteration.

In each iteration, the wavefront-shaped light signal 314 is transmitted through the diffusive medium 302, and the output scattered light signal 316 is recorded by an image capture apparatus 318 (e.g., a camera) as a test image 320. The test image 320 is then fed back to a training pattern adjuster 317 of the phase pattern compensator 322, which adjusts the phase pattern 306 to yield another test image 320 that typically the target image 304 more closely matches than the test image 320 of the previous iteration. The adjusted training phase pattern 313 is output from the phase pattern compensator 322 as the phase pattern 306, which is applied to the spatial light modulator 308. This training loop continues until a compensation condition is satisfied to indicate that the test image 320 adequately approximates or matches the target image 304. In this manner, upon satisfaction of a compensation condition, the target image 304 is encoded in the resulting phase pattern 306.

Figure 4:
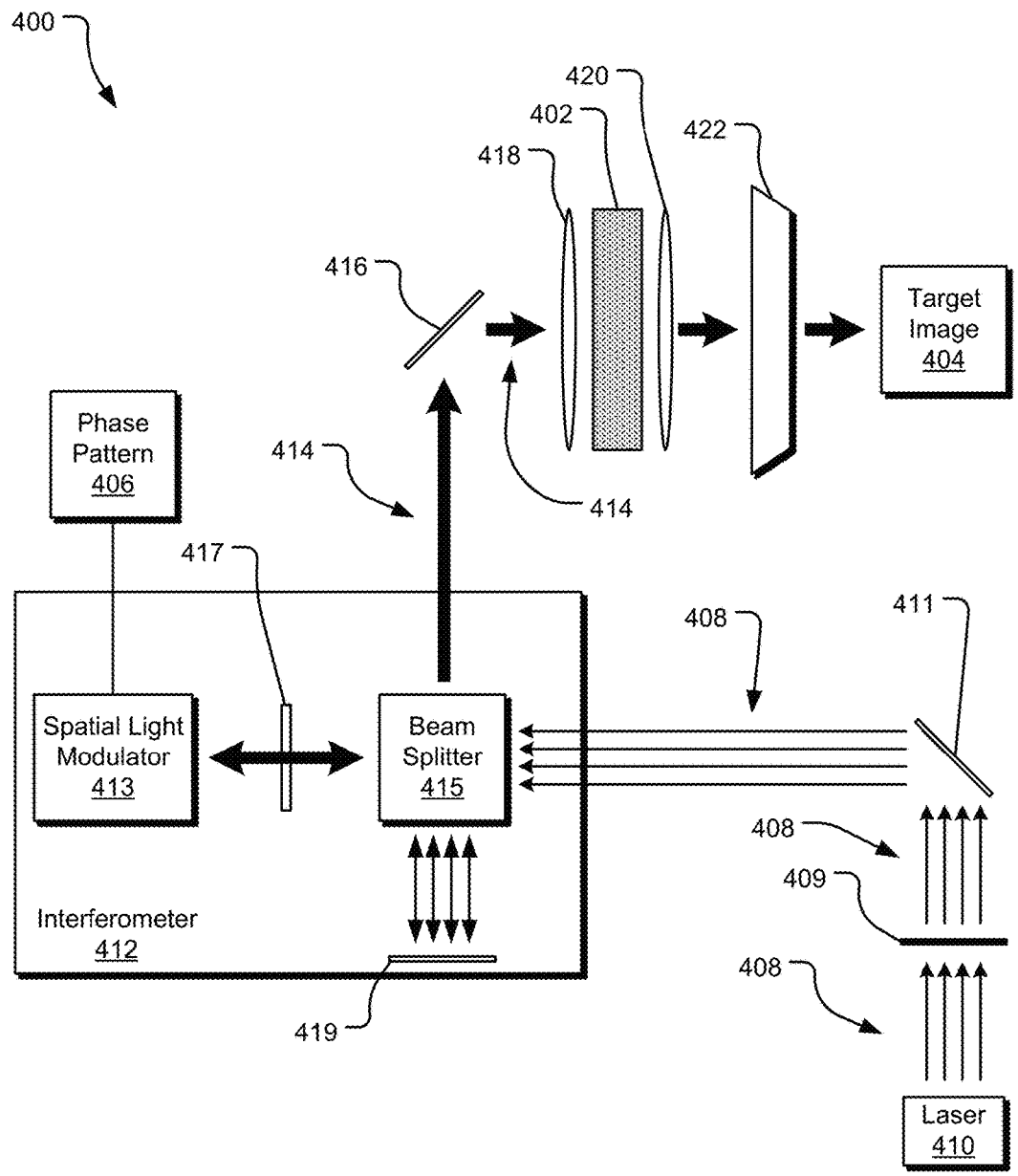
FIG. 4 illustrates details of an example image decoding system using a diffusive medium to decode a target image from a phase pattern.

FIG. 4 illustrates details of an example image decoding system 400 using a diffusive medium 402 to decode a target image 404 from a phase pattern 406. In one implementation, the phase pattern 406 is generated using the same process or a similar process as described with regard to the encoding system of FIG. 3. Regardless of the encoding process used, however, the phase pattern 406 is encoded with the target image 404.

To decode the phase pattern 406 and obtain the target image 404, collimated light 408, such as that generated by a laser 410, is transmitted into an interferometer 412, which also receives the phase pattern 406 as input. In one implementation, the collimated light 408 is transmitted through a half-wave ($\lambda/2$) plate 409 and reflected by a mirror 411 to a beam splitter 415 in the interferometer 412. Intermediate optical elements, such as lenses, may be positioned in the optical path between the laser 410 and the interferometer 412. In alternative implementations, the light input to the interferometer 412 need not be collimated, as coherent light may be employed instead.

In one implementation, the interferometer 412 includes a beam splitter 415, a polarizer 417, a mirror 419, and a spatial light modulator 413, although other configurations are contemplated. The spatial light modulator 413 adjusts (e.g., modulates) the phase of light corresponding to pixels or areas of the phase pattern 406 (wherein a pixel is considered a small area of the phase pattern) to generate a wavefront-shaped light signal 414 having different phases at different pixels or areas across the wavefront region (wherein a pixel is considered a small area of the wavefront region). The wavefront-shaped light 414 represents an encoded version of the target image 404 based on the phase differences in the light signal that can be decoded by the diffusive medium 402.

The interferometer 412 outputs the wavefront-shaped light signal 414 to a mirror 416, which directs the wavefront-shaped light signal 414 through an objective 418 (e.g., one or more lenses), the diffusive medium 402, and another objective 420. Intermediate optical elements, such as lenses, may be positioned in the optical path between the interferometer 412 and the mirror 416. An image capture apparatus 422 (e.g., a camera) records the light emitting from the objective 420 as the decoded target image 404. The image decoding system 400 can process single images, multiple images, high frame rate encoded images, etc.

Figure 5:
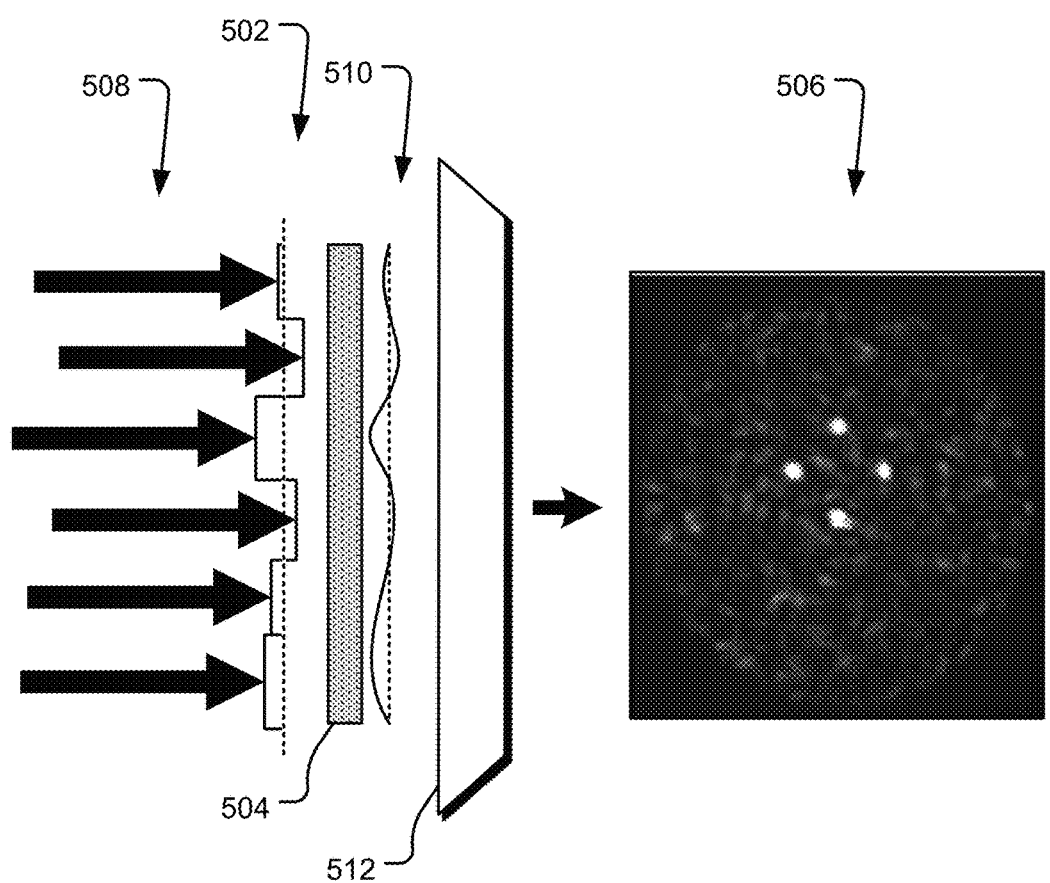
FIG. 5 illustrates an example of applying a phase-pattern-shaped wavefront to a diffusive medium to decode a target image.

FIG. 5 illustrates an example of applying a phase-pattern-shaped wavefront 502 to a diffusive medium 504 to decode a target image 506. The wavefront 502 illustrates a light signal 508 having phase differences introduced by a phase pattern (not shown) and encoding the target image 506 therein. The wavefront 502 is transmitted through the diffusive medium 504 and output as a decoded optical signal 510, which is recorded by an image capture apparatus 512 as the decoded target image 506.

Figure 6:
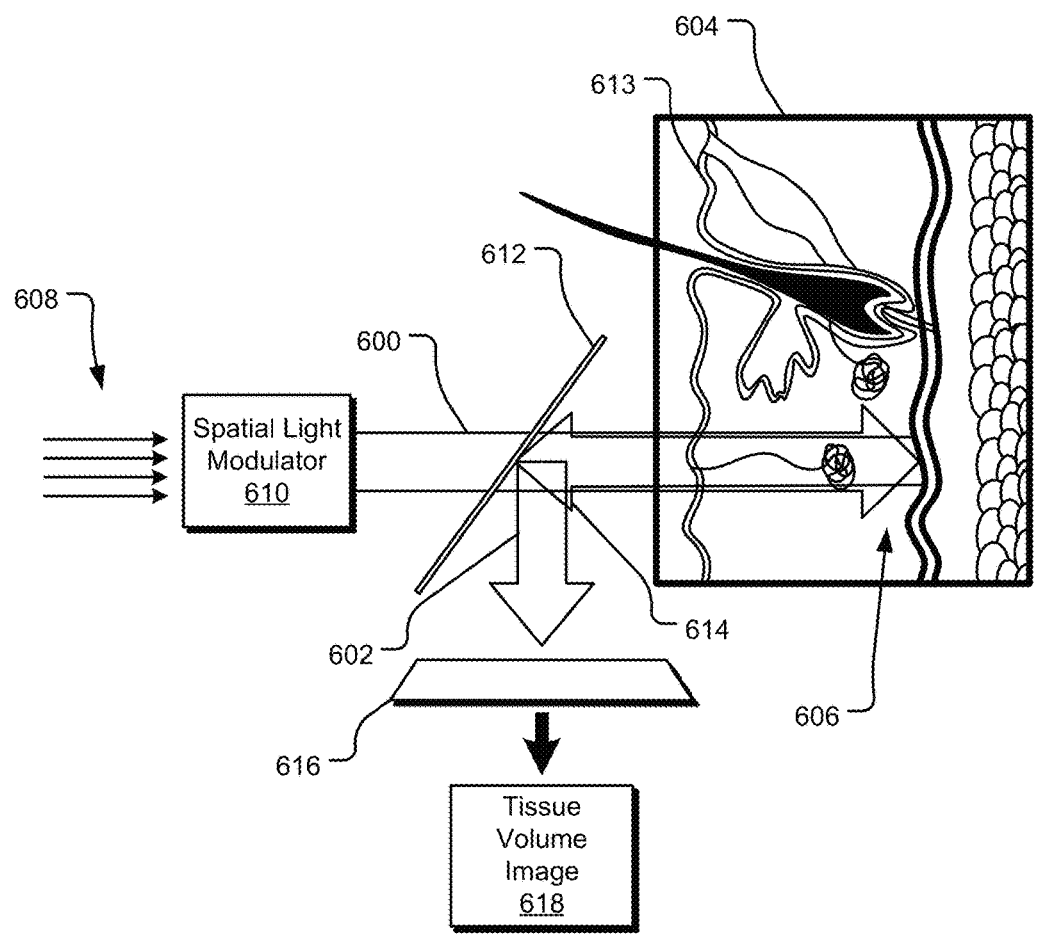
FIG. 6 illustrates an example of applying a phase-pattern-shaped wavefront to obtain image data from a tissue volume exhibiting spatially and temporally variable content.

FIG. 6 illustrates an example of applying a phase-shaped wavefront light signal 600 to obtain image data 602 from a tissue volume 604 exhibiting spatially and temporally variable content 606. Collimated or coherent light 608 is transmitted to a spatial light modulator 610, which introduces spatially and/or temporally variable phase differences to yield the phase-shaped wavefront signal 600. The collimated or coherent light 608 may be in the near-infrared spectrum, although other spectral ranges of light may be employed.

The phase-shaped wavefront signal 600 is transmitted through a beam splitter 612 and skin 613 and into the tissue volume 604, which acts as a diffusive medium. A scattered light signal 614 emanates from the tissue volume 604 and is redirected as the image data 602. The variable phase differences of the phase-shaped wavefront signal 600 enhance penetration and scattering of the tissue volume 604 to increase the resolution and the signal-to-noise ratio in the image data 602. An image capture apparatus 616 records the image data 602 to yield a tissue volume image 618 of the tissue volume 604.

Figure 7:
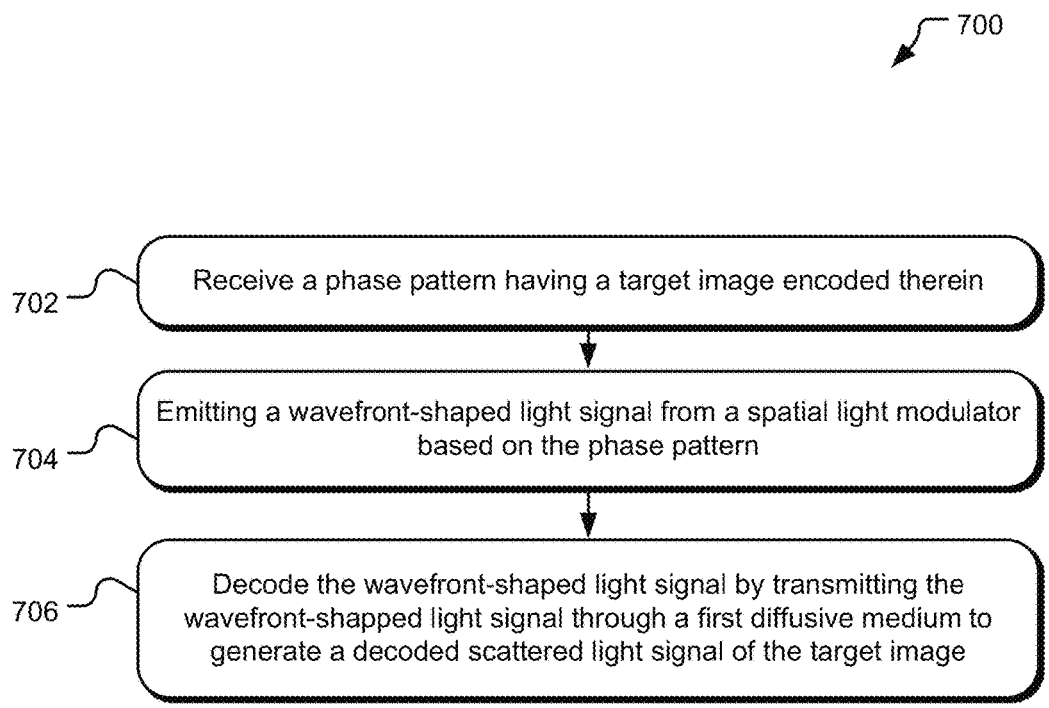
FIG. 7 illustrates example operations for decoding imaging through diffusive media with wavefront shaping.

FIG. 7 illustrates example operations 700 for decoding imaging through diffusive media with wavefront shaping. A receiving operation 702 receives a phase pattern having a target image encoded therein. Such a phase pattern may be encoded using encoding methods and systems described herein. An emitting operation 704 emits a wavefront-shaped light signal from a spatial light modulator based on the phase pattern. In one implementation, the emitting operation 704 applies the phase pattern to collimated or coherent light to yield the wavefront-shaped light signal. A decoding operation 706 decodes the wavefront-shaped light signal by transmitting the wavefront-shaped light signal through a first diffusive medium to generate a decoded scattered light signal of the target image.

Figure 8:
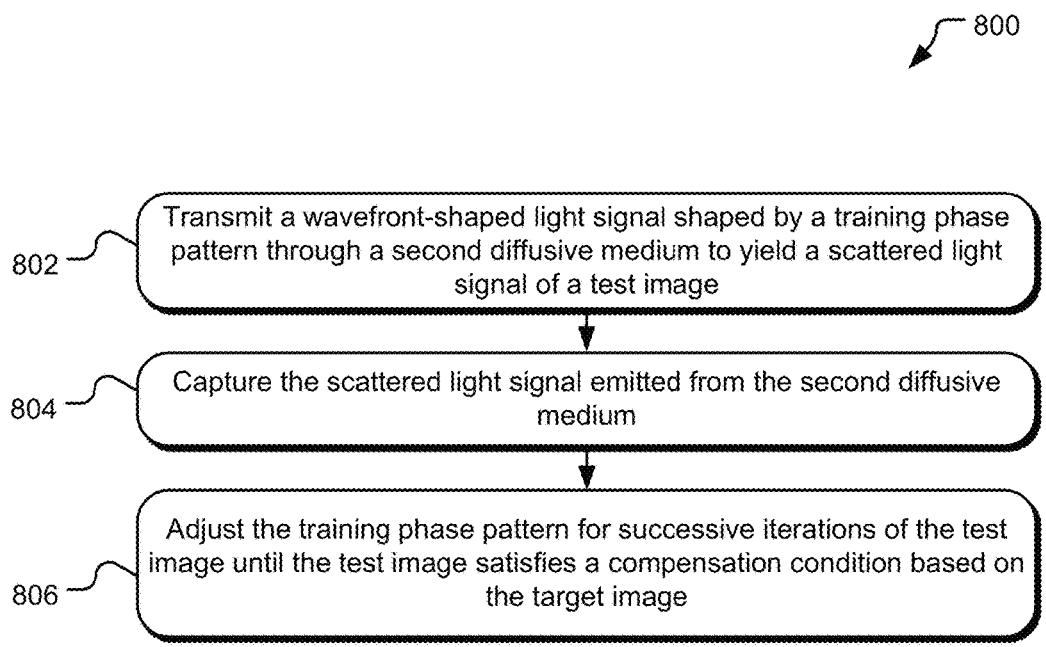
FIG. 8 illustrates example operations for encoding imaging through diffusive media with wavefront shaping.

FIG. 8 illustrates example operations 800 for encoding imaging through diffusive media with wavefront shaping. A transmission operation 802 transmits a wavefront-shaped light signal shaped by a training phase pattern through a second diffusive medium to yield a scattered light signal encoding a test image. In one implementation, the wavefront-shaped light signal is generated by a phase pattern applied to a collimated or coherent light using an interferometer (e.g., an interferometer that includes a spatial light modulator).

The second diffusive medium has the optical scattering characteristics of the diffusive medium that is to be used to decode a target image from the resulting phase pattern. A capturing operation 804 records the scattered light signal emitted from the second diffusive medium. An adjusting operation 806 adjusts the training phase pattern for successive iterations of the test image until the test image satisfies a compensation condition based on the target image. The resulting training phase pattern yields the phase pattern having a target image encoded therein. Such a phase pattern may be decoded using decoding methods and systems described herein.

Figure 9:
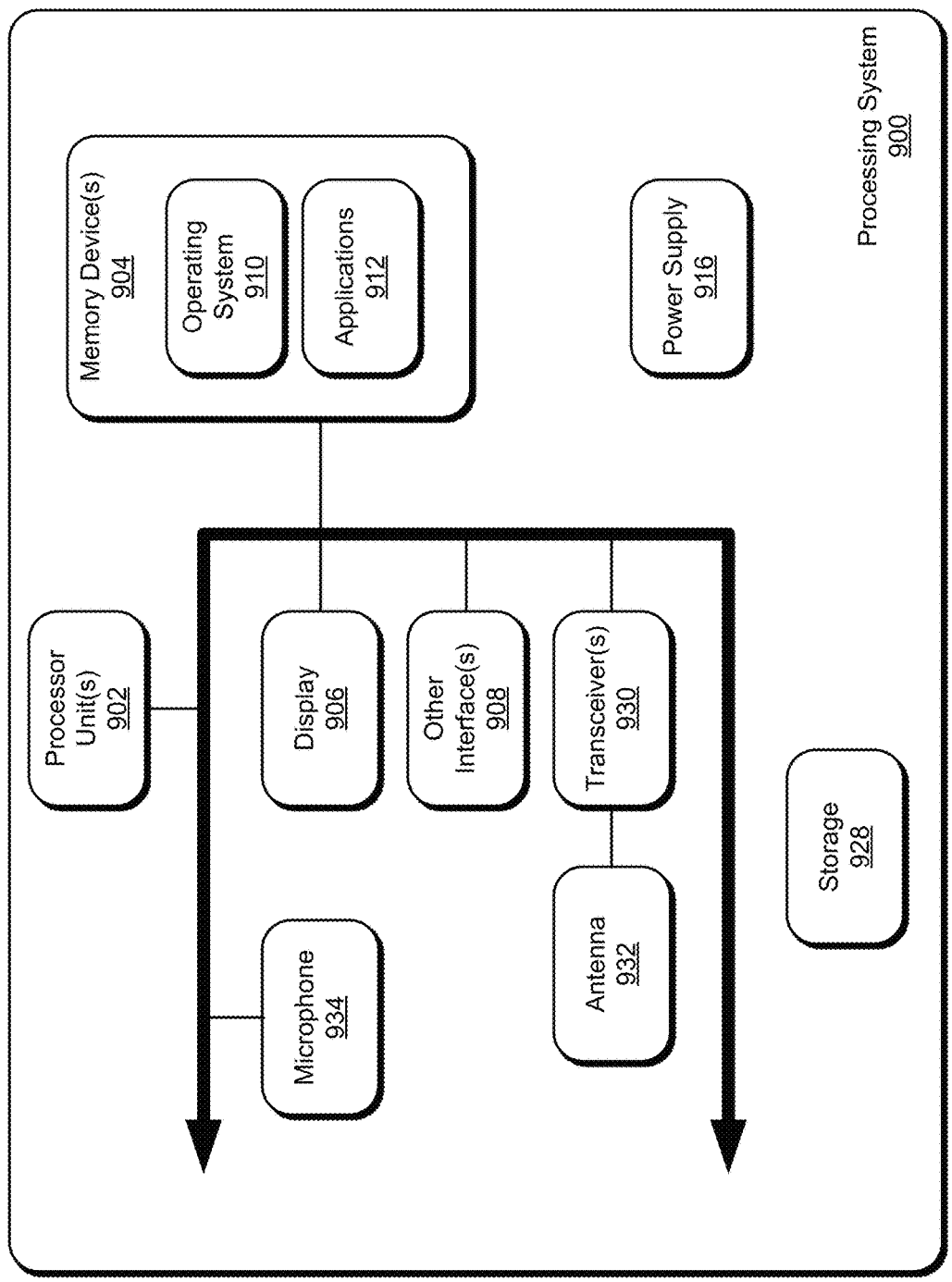
FIG. 9 illustrates an example processing system for use in imaging through diffusive media with wavefront shaping.

FIG. 9 illustrates an example processing system 900 for use in imaging through diffusive media with wavefront shaping. The processing system 900 includes one or more processor units 902 (discrete or integrated microelectronic chips and/or separate but integrated processor cores), at least one memory device 904 (which may be integrated into systems or chips of the processing system 900), a display 906 (e.g., a touchscreen display), and other interfaces 908 (e.g., a keyboard interface). The memory device 904 generally includes both volatile memory (e.g., RAM) and non-volatile memory (e.g., flash memory). An operating system 910, such as one of the varieties of the Microsoft Windows® operating system, resides in the memory device 904 and is executed by at least one of the processor units 902, although it should be understood that other operating systems may be employed.

One or more applications 912, such as a phase pattern compensator, a training pattern calculator, a training pattern adjustor, etc., are loaded in the memory device 904 and executed on the operating system 910 by at least one of the processor units 902. The processing system 900 includes a power supply 916, which is powered by one or more batteries and/or other power sources and which provides power to other components of the processing system 900. The power supply 916 may also be connected to an external power source that overrides or recharges the built-in batteries or other power sources.

The processing system 900 includes one or more communication transceivers 930 to provide network connectivity (e.g., mobile phone network, Wi-Fi®, BlueTooth®, etc.). The processing system 900 also includes various other components, such as a positioning system (e.g., a global positioning satellite transceiver), one or more accelerometers, one or more cameras, an audio interface (e.g., a microphone 934, an audio amplifier and speaker and/or audio jack), one or more antennas 932, and additional storage 928. Other configurations may also be employed.

In an example implementation, a mobile operating system, various applications, modules for phase pattern compensator, a training pattern calculator, a training pattern adjustor and other modules and services may be embodied by instructions stored in memory 904 and/or storage devices 928 and processed by the processing unit 902. Phase patterns, test images, target images, training phase patterns, and other data may be stored in memory 904 and/or storage devices 928 as persistent datastores.

An example system includes a phase pattern having a target image encoded therein, a spatial light modulator communicatively coupled to receive the phase pattern and configured to emit a wavefront-shaped light signal based on the phase patter, and a first diffusive medium positioned to receive the wavefront-shaped light signal and to emit a decoded scattered light signal of the target image.

Another example system of any preceding system further includes an image capture apparatus positioned to record the decoded scattered light signal of the target image.

Another example system of any preceding system is provided wherein the spatial light modulator is a component of an interferometer.

Another example system of any preceding system further includes a target image encoding system including a second diffusive medium having the optical scattering characteristics of the first diffusive medium.

Another example system of any preceding system further includes a target image encoding system including the first diffusive medium for encoding the target image in the phase pattern.

Another example system of any preceding system further includes a target image encoding system including a phase pattern compensator configured to generate the phase pattern, the phase pattern compensator adjusting a training phase pattern until a test image, generated based on the target image and a second diffusive medium, satisfies a compensation condition based on the target image, the resulting training phase pattern yielding the phase pattern having a target image encoded therein.

Another example system of any preceding system is provided wherein the first diffusive medium includes a tissue volume.

Another example system of any preceding system is provided wherein the wavefront-shaped light signal includes areas of light having a phase delay relative to other areas of light within the wavefront-shaped light signal.

Another example system of any preceding system is provided wherein the target image is encoded in the phase pattern as relative phase differences.

Another example system of any preceding system further includes a target image encoding system including a second diffusive medium having the optical scattering characteristics of the first diffusive medium, a spatial light modulator communicatively coupled to receive a training phase pattern and to transmit another wavefront-shaped light signal through the second diffusive medium to yield a scattered light signal encoding a test image, an image capture apparatus positioned to record the scattered light signal encoding the test image, and a phase pattern compensator communicatively coupled to receive the test image and the target image, the phase pattern compensator adjusting the training phase pattern for successive iterations of the test image until the test image satisfies a compensation condition based on the target image, the resulting training phase pattern yielding the phase pattern having the target image encoded therein.

An example method includes receiving a phase pattern having a target image encoded therein, emitting a wavefront-shaped light from a spatial light modulator based on the phase pattern, and decoding the wavefront-shaped light by transmitting the wavefront-shaped light through a first diffusive medium to generate a decoded light signal of the target image.

Another example method of any preceding method further includes recording the decoded light signal of the target image using the image capture apparatus.

Another example method of any preceding method is provided wherein the spatial light modulator is a component of an interferometer.

Another example method of any preceding method further includes encoding the target image into the phase pattern using a second diffusive medium having the optical scattering characteristics of the first diffusive medium.

Another example method of any preceding method further includes encoding the target image into the phase pattern using the first diffusive medium.

Another example method of any preceding method further includes generating the phase pattern by adjusting a training phase pattern until a test image, generated based on the target image and a second diffusive medium, satisfies a compensation condition based on the target image, the resulting training phase pattern yielding the phase pattern having a target image encoded therein.

Another example method of any preceding method is provided wherein the wavefront-shaped light includes areas of light having a phase delay relative to other areas of light within the wavefront-shaped light.

Another example method of any preceding method is provided wherein the target image is encoded in the phase pattern as relative phase differences.

Another example method of any preceding method further includes encoding the target image into the phase pattern by transmitting a wavefront-shaped light shaped by a training phase pattern through a second diffusive medium to yield a scattered light signal encoding a test image, the second diffusive medium having the optical scattering characteristics of the first diffusive medium, capturing the scattered light signal emitted from the second diffusive medium, the scattered light signal encoding the test image, and adjusting the training phase pattern for successive iterations of the test image until the test image satisfies a compensation condition based on the target image, the resulting training phase pattern yielding the phase pattern having the target image encoded therein.

Another example system includes a phase pattern having a target image encoded therein, a spatial light modulator communicatively coupled to receive the phase pattern and configured to emit a wavefront-shaped light based on the phase pattern, and a first diffusive medium positioned to receive the wavefront-shaped light and to emit a decoded light signal of a target image, the target image being previously encoded in the phase pattern by transmitting another wavefront-shaped light shaped by a training phase pattern through a second diffusive medium to yield a scattered light signal encoding a test image, the second diffusive medium having the optical scattering characteristics of a first diffusive medium, capturing the light signal emitted from the second diffusive medium, recording the scattered light signal encoding the test image, and adjusting the training phase pattern for successive iterations of the test image until the test image satisfies a compensation condition based on the target image, the resulting training phase pattern yielding the phase pattern having the target image encoded therein.

Another example system includes means for receiving a phase pattern having a target image encoded therein, means for emitting a wavefront-shaped light from a spatial light modulator based on the phase pattern, and means for decoding the wavefront-shaped light by transmitting the wavefront-shaped light through a first diffusive medium to generate a decoded light signal of the target image.

Another example system of any preceding system further includes means for recording the decoded light signal of the target image using the image capture apparatus.

Another example system of any preceding system is provided wherein the spatial light modulator is a component of an interferometer.

Another example system of any preceding system further includes means for encoding the target image into the phase pattern using a second diffusive medium having the optical scattering characteristics of the first diffusive medium.

Another example system of any preceding system further includes encoding the target image into the phase pattern using the first diffusive medium.

Another example system of any preceding system further includes generating the phase pattern by adjusting a training phase pattern until a test image, generated based on the target image and a second diffusive medium, satisfies a compensation condition based on the target image, the resulting training phase pattern yielding the phase pattern having a target image encoded therein.

Another example system of any preceding system is provided wherein the wavefront-shaped light includes areas of light having a phase delay relative to other areas of light within the wavefront-shaped light.

Another example system of any preceding system is provided wherein the target image is encoded in the phase pattern as relative phase differences.

Another example system of any preceding system further includes means for encoding the target image into the phase pattern by transmitting a wavefront-shaped light shaped by a training phase pattern through a second diffusive medium to yield a scattered light signal encoding a test image, the second diffusive medium having the optical scattering characteristics of the first diffusive medium, means for capturing the scattered light signal emitted from the second diffusive medium, the scattered light signal encoding the test image, and means for adjusting the training phase pattern for successive iterations of the test image until the test image satisfies a compensation condition based on the target image, the resulting training phase pattern yielding the phase pattern having the target image encoded therein.

The implementations of the technology described herein are implemented as logical steps in one or more computer systems. The logical operations of the disclosed technology may be implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up implementations of the technology described herein are referred to variously as technological operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary implementations of the described technology. Since many implementations of the described technology can be made without departing from the spirit and scope of the invention, the invention resides in the claims hereinafter appended. Furthermore, structural features of the different embodiments may be combined in yet another implementation without departing from the recited claims.

What is claimed is:

1. A system comprising:
   a phase pattern having a target image encoded therein;
   a spatial light modulator communicatively coupled to receive the phase pattern and configured to emit a wavefront-shaped light signal based on the phase pattern; and
   a first diffusive medium positioned to receive the wavefront-shaped light signal and to emit a decoded scattered light signal of the target image.

2. The system of claim 1 further comprising:
   an image capture apparatus positioned to record the decoded scattered light signal of the target image.

3. The system of claim 1 wherein the spatial light modulator is a component of an interferometer.

4. The system of claim 1 further comprising:
   a target image encoding system including a second diffusive medium having the optical scattering characteristics of the first diffusive medium.

5. The system of claim 1 further comprising:
   a target image encoding system including the first diffusive medium for encoding the target image in the phase pattern.

6. The system of claim 1 further comprising:
   a target image encoding system including a phase pattern compensator configured to generate the phase pattern, the phase pattern compensator adjusting a training phase pattern until a test image, generated based on the target image and a second diffusive medium, satisfies a compensation condition based on the target image, the resulting training phase pattern yielding the phase pattern having a target image encoded therein.

7. The system of claim 1 wherein the first diffusive medium includes a tissue volume.

8. The system of claim 1 wherein the wavefront-shaped light signal includes areas of light having a phase delay relative to other areas of light within the wavefront-shaped light signal.

9. The system of claim 1 wherein the target image is encoded in the phase pattern as relative phase differences.

10. The system of claim 1 further comprising:
a target image encoding system including
- a second diffusive medium having the optical scattering characteristics of the first diffusive medium;
- a second spatial light modulator communicatively coupled to receive a training phase pattern and to transmit another wavefront-shaped light signal through the second diffusive medium to yield a scattered light signal encoding a test image;
- an image capture apparatus positioned to record the scattered light signal encoding the test image; and
- a phase pattern compensator communicatively coupled to receive the test image and the target image, the phase pattern compensator adjusting the training phase pattern for successive iterations of the test image until the test image satisfies a compensation condition based on the target image, the resulting training phase pattern yielding the phase pattern having the target image encoded therein.

11. A method comprising:
receiving a phase pattern having a target image encoded therein;
emitting a wavefront-shaped light from a spatial light modulator based on the phase pattern; and
decoding the wavefront-shaped light by transmitting the wavefront-shaped light through a first diffusive medium to generate a decoded light signal of the target image.

12. The method of claim 11 further comprising:
recording the decoded light signal of the target image using an image capture apparatus.

13. The method of claim 11 wherein the spatial light modulator is a component of an interferometer.

14. The method of claim 11 further comprising:
encoding the target image into the phase pattern using a second diffusive medium having the optical scattering characteristics of the first diffusive medium.

15. The method of claim 11 further comprising:
encoding the target image into the phase pattern using the first diffusive medium.

16. The method of claim 11 further comprising:
generating the phase pattern by adjusting a training phase pattern until a test image, generated based on the target image and a second diffusive medium, satisfies a compensation condition based on the target image, the resulting training phase pattern yielding the phase pattern having a target image encoded therein.

17. The method of claim 11 wherein the wavefront-shaped light includes areas of light having a phase delay relative to other areas of light within the wavefront-shaped light.

18. The method of claim 11 wherein the target image is encoded in the phase pattern as relative phase differences.

19. The method of claim 11 further comprising encoding the target image into the phase pattern by
- transmitting a wavefront-shaped light shaped by a training phase pattern through a second diffusive medium to yield a scattered light signal encoding a test image, the second diffusive medium having the optical scattering characteristics of the first diffusive medium;
- capturing the scattered light signal emitted from the second diffusive medium, the scattered light signal encoding the test image; and
- adjusting the training phase pattern for successive iterations of the test image until the test image satisfies a compensation condition based on the target image, the resulting training phase pattern yielding the phase pattern having the target image encoded therein.

20. A system comprising:
a phase pattern having a target image encoded therein;
a spatial light modulator communicatively coupled to receive the phase pattern and configured to emit a wavefront-shaped light based on the phase pattern; and
a first diffusive medium positioned to receive the wavefront-shaped light and to emit a decoded light signal of a target image, the target image being previously encoded in the phase pattern by transmitting another wavefront-shaped light shaped by a training phase pattern through a second diffusive medium to yield a scattered light signal encoding a test image, the second diffusive medium having the optical scattering characteristics of a first diffusive medium, capturing the light signal emitted from the second diffusive medium, recording the scattered light signal encoding the test image, and adjusting the training phase pattern for successive iterations of the test image until the test image satisfies a compensation condition based on the target image, the resulting training phase pattern yielding the phase pattern having the target image encoded therein.

* * * * *